(12) United States Patent
Smyth et al.

(10) Patent No.: US 7,822,630 B1
(45) Date of Patent: Oct. 26, 2010

(54) FORECASTING WITH PARALLEL PROCESSING

(75) Inventors: Mark N. Smyth, Innisfil (CA); Ejaz Haider, Markham (CA); Siamak Safarian, Richmond Hill (CA); Shireengul Islam, Markham (CA)

(73) Assignee: Teradata US, Inc., Miamisburg, OH (US)

( * ) Notice: Subject to any disclaimer, the term of this patent is extended or adjusted under 35 U.S.C. 154(b) by 1832 days.

(21) Appl. No.: 10/922,578

(22) Filed: Aug. 20, 2004

Related U.S. Application Data

(60) Provisional application No. 60/528,871, filed on Dec. 11, 2003.

(51) Int. Cl.
*G06Q 99/00* (2006.01)

(52) U.S. Cl. .............................. 705/10; 705/1.1; 707/2; 707/100; 706/21; 702/19

(58) Field of Classification Search ............... 705/1, 705/26–27, 35, 30, 10, 1.1; 706/21, 46; 707/2, 707/3, 100; 702/19
See application file for complete search history.

(56) References Cited

U.S. PATENT DOCUMENTS

| | | | |
|---|---|---|---|
| 5,461,699 A * | 10/1995 | Arbabi et al. ................. 706/21 |
| 5,761,654 A * | 6/1998 | Tow ................................... 1/1 |
| 6,434,544 B1 * | 8/2002 | Bakalash et al. ............... 707/2 |
| 2003/0009290 A1 * | 1/2003 | Billet et al. ................... 702/19 |
| 2003/0018514 A1 * | 1/2003 | Billet et al. ................... 705/10 |
| 2005/0262108 A1 * | 11/2005 | Gupta ......................... 707/100 |

OTHER PUBLICATIONS

Hart, Leslie, "Evaluation of Parallel Processing Technology for Operational Capability at the Forecast Systems Laboratory", 1994, NOAA Forecast Systems Laboratory, pp. 1-6.*

Zhang, Xiaodong, "Performance Prediction and Evaluation of Parallel Processing on a NUMA Multiprocessor", 1991, University of Texas at San Antonio, 24 pgs.*

Oralcle Express Server- Delivering OLAP to the Enterprise, Jan. 1997, An Oracle White Paper, 31 pages.*

"Information Technology in Manufacturing", Dec. 1997, v15, n12, pp: 48-62, 20 pgs.*

* cited by examiner

*Primary Examiner*—John W Hayes
*Assistant Examiner*—Freda A Nelson
(74) *Attorney, Agent, or Firm*—Schwegman, Lundberg & Woessner

(57) ABSTRACT

Data consumed by a threaded forecasting module is acquired in advance of a request for that data by the forecasting module. The data is used for servicing multiple instances of the threaded forecasting module as they concurrently process. The instances concurrently produce different portions of the forecasting results.

14 Claims, 3 Drawing Sheets

FORECASTING WITH PARALLEL PROCESSING

RELATED APPLICATIONS

The present application claims priority to U.S. Provisional Application. No. 60/528,871, entitled "Improved System and Method for Forecasting Retail Product Orders," filed on Dec. 11, 2003, the disclosure of which is incorporated by reference herein.

FIELD OF THE INVENTION

The present invention relates to data processing and in particular to techniques for processing forecasting modules in parallel.

BACKGROUND OF THE INVENTION

Data collection and analysis have become vital organizational tasks in today's highly connected economy. One particular area of collection and analysis is demand forecasting. Organizations use demand forecasts to allocate resources, schedule purchases related to inventory, plan revenue, plan expenses, plan inventory, and for a variety of other reasons.

Large organizations may collect data which is processed by demand forecasting utilities for a multitude of each organization's individual stores, products, etc. That data is typically centrally stored by each organization in a database or data warehouse for all of the organization's stores, products, etc. Consequently, when demand forecasts are needed for specific stores, specific products, etc., the processing load and processing timeliness can become problematic, since the volume of the collected data can be daunting.

To deal with this problem, organizations have developed elaborate schedules and techniques for more efficiently processing and acquiring demand forecasts. For example, an organization may set time aside in the evening during a particular day or the week during which their demand forecast utilities can have exclusive access to their data store and one or more processing nodes. As another example, the organization may require that any particular store or individual requiring a demand forecast submit a request for processing that includes a preset time lag, which gives the organization time to schedule and execute the appropriate forecast utilities.

Yet, even with these and other manual and semi-automated techniques and procedures, the control associated with processing forecast utilities for large amounts of data remains closely guarded and controlled by organizations; because of the processing loads and the resources needed to execute these forecast utilities.

Consequently, departments or individuals affected by demand forecasts become frustrated by what they perceive to be incompetence or excessive bureaucracy within their organizations. These individuals may consume even more time and resources of the organization by organizing design teams of developers or project managers in order to attempt to streamline the production of demand forecasts.

Therefore, there is a need for improved techniques for producing demand forecasts, such that the processing loads and timeliness associated with demand forecasts production can be improved.

SUMMARY OF THE INVENTION

In various embodiments of this invention techniques are provided for generating demand forecast by using parallel processing with demand forecasting modules.

More specifically, and in one embodiment, a method to forecast with parallel processing is presented. Initially, data is extracted from a data store, where that data is subsequently requested and processed to produce forecasting results. A first forecasting module is serviced with portions of the data, and concurrently a second forecasting module is serviced with other portions of the data. Next, the first and second forecasting modules concurrently produce the forecasting results in response to being serviced with the data.

DETAILED DESCRIPTION OF THE INVENTION

As used herein the phrase "threaded forecasting module" refers to a software application or set of applications that may be processed concurrently or in parallel with another (duplicate) executing instance of that threaded forecasting module. This does not mean that specialized event driving code need be used within the software associated with the threaded forecasting module. However, it does mean that multiple and duplicate instances can concurrently process.

For example, and as will be discussed in greater detail herein and below, two separate instance may process different portions of input data and produce different portions of forecasting results data, such that when the two executing instances complete processing the combined results of the two produce the entire forecasting results that a single forecasting module would have produced had that single forecasting module processed all the data by itself.

Functions associated with forecasting modules are well known to one or ordinary skill in the art. These functions and others (as will be discussed below) are therefore intended to be available within forecasting modules of this invention. One novel function presented herein is support for fractional demand calculations. That is, the functions provided with the embodiments of this invention can support unit demand forecasts that are fractional (e.g., less than a whole integer number).

In various embodiments, of this invention a data management module is presented. This data management module, among other things, performs a fast export of input data into a first queue, distributes portions of that data to forecasting modules concurrently processing, and houses portions of forecasting results produced by the forecasting modules in a second queue for subsequent update to a data store. An example of such a data management module or techniques and systems associated therewith can be found in U.S. application Ser. No. 10/722,296, entitled "Techniques for Managing Interactions between Applications and a Data Store" and commonly assigned to NCR Corporation of Dayton, Ohio; the disclosure of which is incorporated by reference herein.

In various embodiments of this invention, the techniques presented herein are compatible with any commercially available database or data warehouse, such as Teradata distributed by NCR Corporation of Dayton, Ohio. Moreover, in one embodiment, the forecasting modules and techniques presented herein and below are implemented in products associated Demand Chain Management Solutions, distributed by NCR Corporation of Dayton, Ohio. Of course other products may also be modified to include the techniques presented herein and still fall within the generous scope of the invention.

Figure 1:
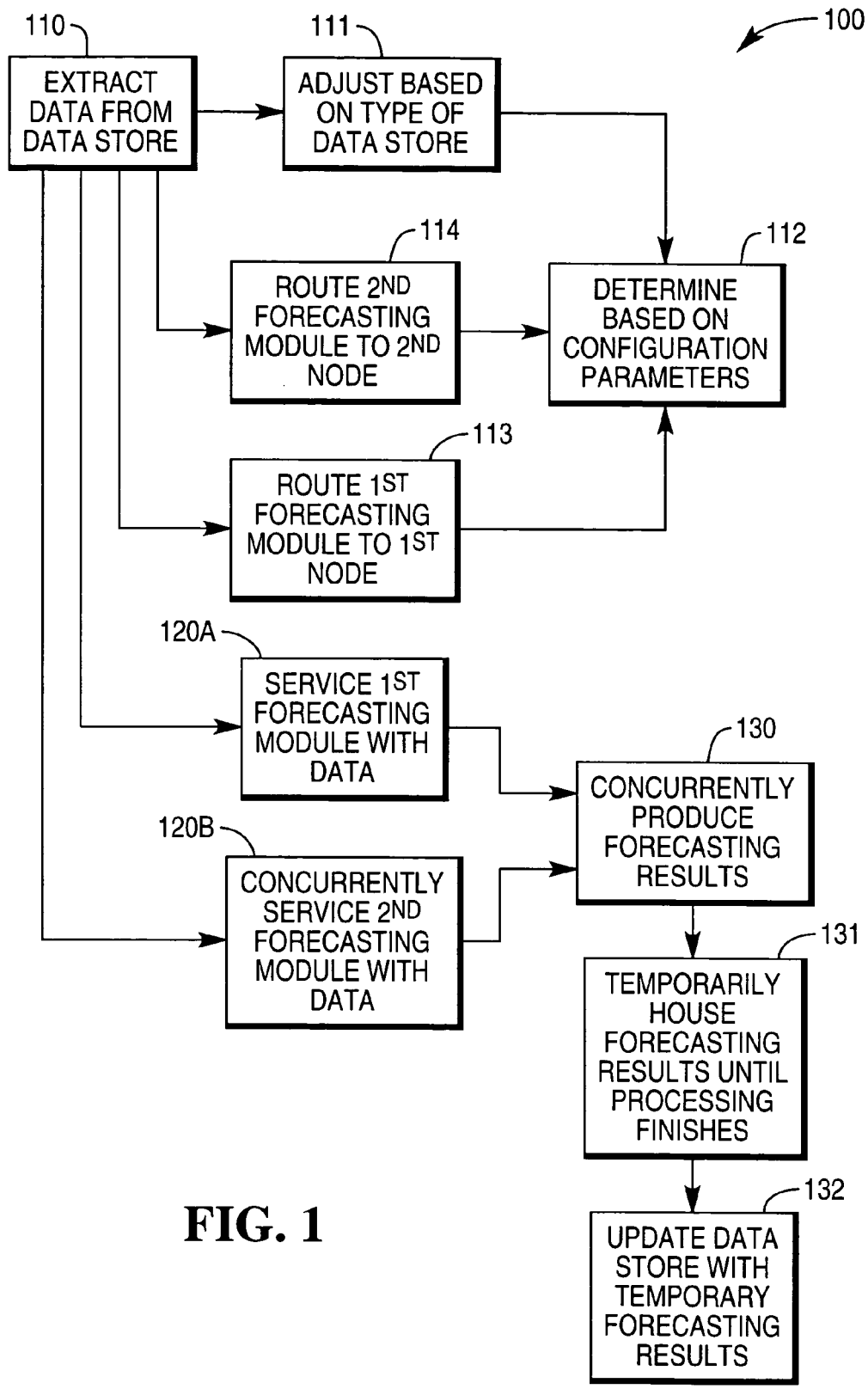
FIG. 1 depicts a diagram of a method for forecasting using parallel processing, according to an example embodiment of the invention.

FIG. 1 illustrates a diagram of a method 100 for forecasting with parallel processing. The method 100 is implemented in a machine-accessible or readable medium and accessible over a network. In one embodiment, the method 100 represents a parent script or application that manages two concurrently processing forecasting modules. The script configures the forecasting modules for processing, acquires and manages data retrieved from a data store in advance of request for that data from the forecasting modules and accumulates different portions of forecasting results that are concurrently produced by the forecasting modules in response to receiving the data.

Initially, at 110, data which is used as input to produce a forecast is extracted from fields of a data store. This data can be housed in a data structure (e.g., queue, custom data structure, list, tree, etc.) or can be indexed in storage, memory, or a combination of storage and memory. Initial data extraction may be achieved by processing data store queries using a syntax language recognized by the data store.

The method 100 is not dependent upon any particular query syntax language. Accordingly, in some embodiments, at 111, the query syntax language used to extract the data can be adjusted or resolved based on a given data store type (e.g., Teradata, Oracle, SQL, etc.). In one embodiment, the data store type is provided to the processing of the method 100 via configuration parameters and, at 112, values associated with those configuration parameters are used to determine specific query syntaxes.

Other configuration parameters can also identify a variety of additional environmental or processing specifics for forecasting modules. For example, at 113, some configuration parameters may identify a specific processing node (e.g., first processing node) for a first forecasting module. Additionally, at 114, other configuration parameters may identify a different processing node (e.g., second processing node) for a second forecasting module.

Configuration parameters can be used for a variety of other reasons, such as when some configuration parameters identify portions of the extracted data that are to be made available in cache or made persistently available in cache (not flushed from the cache). This may be beneficial when certain types of data are used by both forecasting modules and when some types of data are repetitively used during different processing states of the forecasting modules.

In embodiments, with configuration parameters, the method 100 performs the proper configurations and initializations before the first or second forecasting modules are processed.

After the data is extracted from the data store and the first and second forecasting modules are concurrently processing, the method 100, at 120A, services the first forecasting module's requests for portions of the data and concurrently, at 120B, services the second forecasting module's requests for other portions of the data. That is, the first and second forecasting module received different portions of the data. This avoids redundant processing by the forecasting modules.

In one embodiment, servicing is done on a first-come first-serve basis, which means that the data is serially provided to a requesting forecasting module in predefined block or record sizes, such that if the first forecasting module request data first it gets a first chunk of the data and if the second forecasting module requests data immediately after the first request it gets a second chunk of the data. In another embodiment, the configuration parameters may pre-assign or allocate specific record numbers to each of the forecasting modules. In this embodiment, data requests of a particular forecasting module are fulfilled from that forecasting module's assigned record numbers.

As the first and second forecasting modules requests and receive the data, each forecasting module produces different portions of the forecasting results. Thus, at 130, the forecasting results are concurrently produced by the concurrent processing first and second forecasting modules.

In one embodiment, at 131, as forecasting results are accumulated from the concurrently processing first and second forecasting modules, the forecasting results are buffered or temporarily housed until both of the forecasting modules complete processing. This avoids continuous updates to the data store as the forecasting results are being acquired and ensures a single update occurs once all the forecasting results are acquired. Accordingly, at 132, after the forecasting modules complete processing against the data, the data store is updated using the temporary storage, memory, or data structure (e.g., queue, table, tree, list, custom data structure, etc.) which temporarily housed or accumulated the forecasting results.

In another embodiment, as the forecasting results are produced they can be streamed to other applications, devices, and/or systems that may consume the forecasting results. For example, the forecasting results may be streamed to one or more printers or print systems, one or more Online Analytical Processing (OLAP) applications, and the like.

In one embodiment, the first and second forecasting modules are designed to produce demand in optional fractional units. That is the forecasting results and data extracted from the data store as input to the forecasting modules can include numbers that are less than a whole integer number. This is beneficial because often times demand is for a portion of a product and not for a whole product. Additionally, the forecasting results represent demand forecasts for stores, products, etc.

It should be also noted, that although a first and second forecasting module was presented for purposes of illustration, there is no preset limit on the number of forecasting modules that can concurrently interact with the method 100. That is, hundreds or more of first and second forecasting modules can all be concurrently serviced with the extracted data and can all concurrently produce different portions of the forecasting results. The forecasting results represent demand forecasts for goods and/or services.

Figure 2:
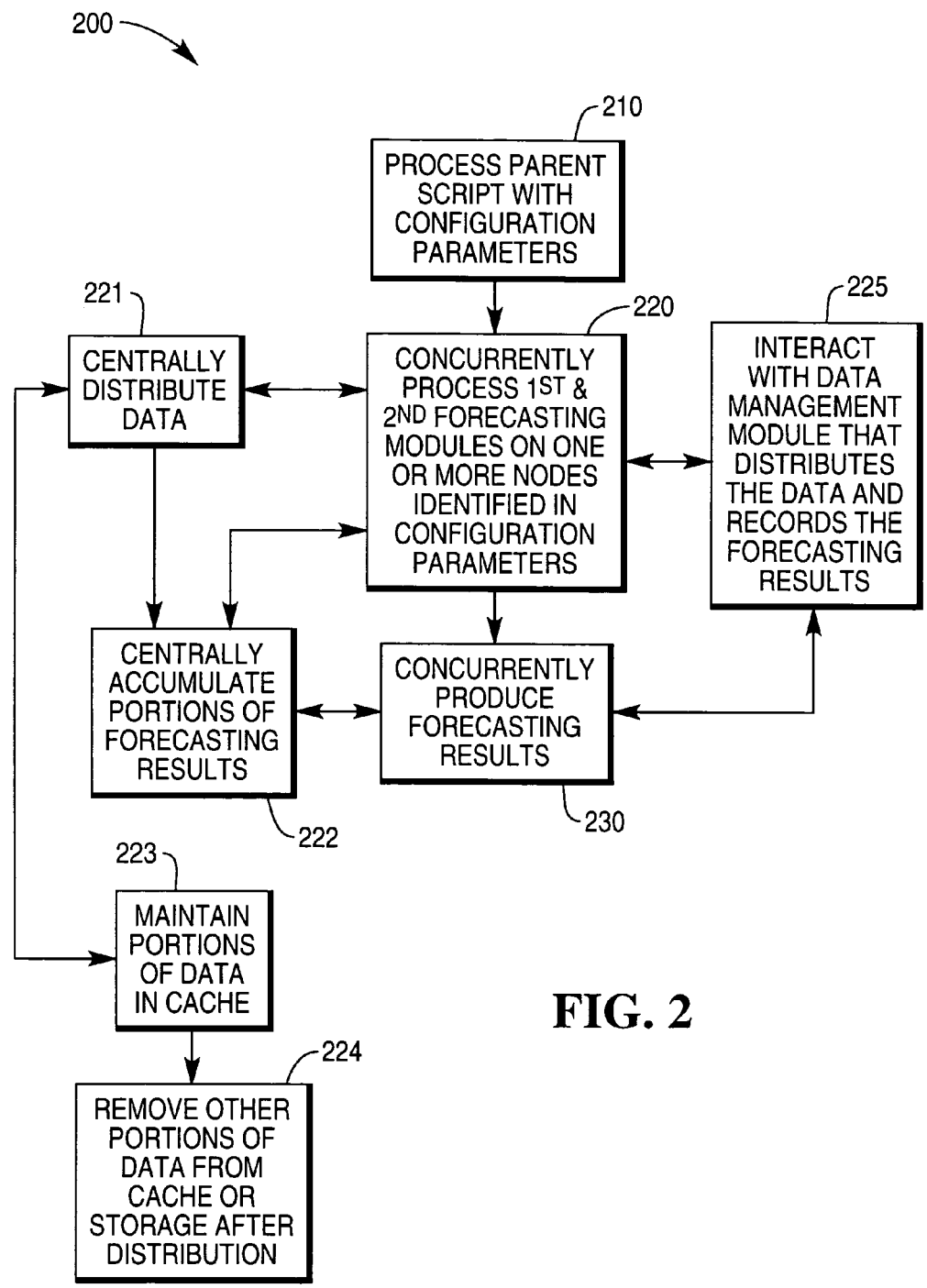
FIG. 2 depicts a diagram of another method for forecasting using parallel processing, according to another example embodiment of the invention.

FIG. 2 illustrates a diagram of a method 200 for forecasting with parallel processing. Again, the method 200 is implemented in a machine-accessible or readable medium and is accessible over any network. In one embodiment, the method 200 represents a processing environment for producing forecasts (forecast results) from two or more concurrently processing forecasting modules.

Initially, at 210, a parent script or applications is processed that acts as a driver and initiator of two or more forecasting modules. The parent script is initially provided configuration parameters. In one embodiment, the configuration parameter values are passed as arguments to the parent script. In another embodiment, the parent script acquires the configuration parameters from storage, memory, a directory, a file, or a database table based on an identity associated with the forecasting modules. Of course other techniques may be used to provide the parent script with a set of configuration parameters that represent processing and environmental settings for the two or more forecasting modules; all of which are intended to fall within the scope of this invention.

The two or more forecasting modules are duplicate versions of the same set of forecasting utilities or applications that concurrently process in parallel with one another. At 220, a first and second (or more than two) forecasting modules are concurrently processed on one or more processing nodes. That is, in one embodiment, the first and second processing nodes concurrently process on the same processing node. In an alternative embodiment, the first and second forecasting modules process on a first processing node and a second processing node, respectively.

In an embodiment, at 221, data is centrally distributed and managed for the first and second forecasting modules. The data is acquired from a data store, such as a database or a data warehouse. In some embodiments, the data is acquired based on selecting particular query syntaxes for a database that houses the data. That is, the configuration parameters can include a database type identifier, which uniquely identifies a type (e.g., Teradata, Oracle, SQL, etc.) for the database. This type permits the proper selection a query syntax which can be used to interface with the database for purposes of acquiring the data. The data is input to the forecasting modules (data collected by organizations related to business transactions and analyzed and processed by forecasting modules).

Data which is centrally distributed to the forecasting modules, at 221, can be distributed in a number of manners. For instance, data can be serially provided to the forecasting modules in the order that the data is requested, such that no particular forecasting module receives the same portion of that data as the other forecasting module. Alternatively, configuration parameters can identify chunks or blocks of the data and designate those chunks or blocks to particular ones of the forecasting modules. While the data is being centrally distributed, it can reside in a data structure (e.g., table, list, tree, queue, custom data structure, object, etc.), memory, or storage (e.g., file, directory, etc.).

As the first and second (two or more) forecasting modules concurrently process different portions of the data, each forecasting module concurrently produces forecasting results, at 230. The combined production of the forecasting results represents a demand forecast for a product, good, store, service, etc.

Moreover, in manners similar to what was discussed above with respect to centrally distributing the input data of the forecasting modules, at 221, portions of the produced forecasting results may be centrally accumulated, at 222. This permit the forecasting results to be batched and updated to a data store once the first and second forecasting module have finished processing. Of course in other situations it may be desirable to stream the forecasting results to other modules, systems, or applications and this can also be done with the teachings of this invention.

In one embodiment, at 223, the centrally distributed data may be cached and/or maintained persistently in cache during the processing lifecycle of the forecasting modules. This is achieved with the use of other configuration parameters, which instruct that certain types of data (e.g., data store fields, etc.) are to persistently remain in cache or made available to the forecasting modules via cache.

Conversely, some data types can be identified as available in cache but capable of being removed or purged from that cache once consumed or once it is determined that they have become stale, at 224. Data types that can be removed or purged from cache based on some events (e.g., stale, used, etc.) do not have to be represented by specific configuration modules, since this can be inferred from the lack of a configuration parameter that indicates that a specific data type is to remain persistently in cache.

In some embodiments, the centrally distribution of the input data to the forecasting modules and the management and accumulation of portions of the forecasting results can be delegated to a data management module, which distributes the input data to the forecasting modules and records and collects portions of the forecasting results from the forecasting modules, at 225. One such data management module is U.S. application Ser. No. 10/722,296, entitled "Techniques for Managing Interactions between Applications and a Data Store," filed on Nov. 25, 2003. U.S. application Ser. No. 10/722,296, commonly assigned to NCR Corporation of Dayton, Ohio, is incorporated by reference herein.

The method 200 presents techniques for producing demand forecasts using parallel processing. This is achieved by separating the specifics of a data store housing input data to the forecasting modules from the core logic of the forecasting modules and by managing the distribution of the forecasting data to the forecasting modules as they concurrently process. Additionally, the production of portions of the forecasting modules are also accumulated and managed. This permit demand forecasts to be produced more efficiently (less processing load or more distributed processing loads) and in a timelier manner than what has been conventionally the case.

Figure 3:
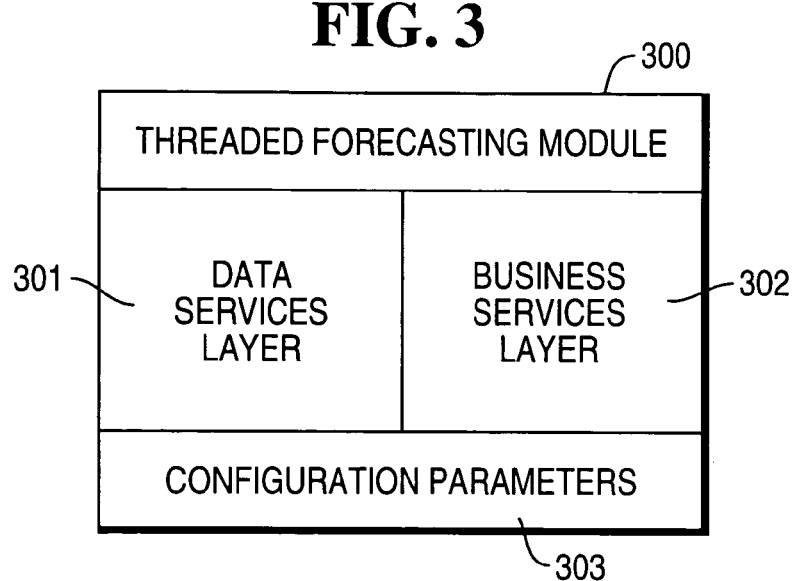
FIG. 3 depicts a diagram of a threaded forecasting module, according to an example embodiment of the invention.

FIG. 3 illustrates a threaded forecasting module 300. The threaded forecasting module 300 is implemented in a machine-accessible and readable medium and is operable to process within a network. The threaded forecasting module 300 includes one or more applications that cooperate with one another. Moreover, the threaded forecasting module 300 is capable of processing in duplicate within a network on a same or different processing node with another processing instance or itself.

The threaded forecasting module 300 includes a data services layer 301, business services layer 302, and optionally configuration parameters 303. The data services layer 301 manages data reads and writes of the business services layer 302. Furthermore, the data services layer 301 interacts with a data management module. The data management module extracts data used as input by the business services layer 302 into memory, data structures, or local storage. That data is then provided to the business services layer 302 on a first-come first-server basis, meaning that multiple instances of the threaded forecasting module 300 receive portions of the input data as they request it. The multiple instances of the threaded forecasting modules 300 typically do not process the same portion of the data.

The data services layer 301 includes one or more modules or applications that cooperate with one another and interact with the data management module and the business services layer 302. The data services layer 301 interacts with the data management module to read and input data consumed by the business services layer 302 and to request writes to forecasting results produced by the business services layer 302 in response to the input data. Moreover, the data management module can interact with multiple data services layers 301 associated with multiple concurrently processing instances of the threaded forecasting module 300.

The business services layer 302 is not dependent upon any particular data store, the specifics of the data store and its query syntax used to acquire the input data is managed by the data services layer 301 and more particularly the data management module which is not part of the threaded forecasting module 300. This separation between the forecasting processing and the initial acquired data store formats, permits the threaded forecasting module 300 to be independent of any particular type of data store (e.g., Teradata, Oracle, SQL, etc.). This means that the threaded forecasting module can process against any data store and can be easily integrated in processing environments of organization which desire demand forecasts for stores, products, goods, services, etc.

The business services layer 302 includes one or more forecasting functions. In fact, any existing, commercially available, or custom developed forecasting function can be included as modules or functions within the business services layer 302. In one embodiment, the forecasting functions of the business services layer 302 supports fractional demand; thus, demand for goods or services can be expressed in units that are less than a whole number.

In one embodiment, the threaded forecasting module 300 includes configuration parameters 303. These parameters 303 can be used for a variety of beneficial purposes. For example, certain ones of the parameters 303 can identify a particular processing node of a network that a particular instance of the threaded forecasting module is to be loaded and executed. Other parameters can identify data types that are to be made available to the business services layer 302 via the data services layer 301 from cache. Still more parameters can instruct the data services layer 301 to persistently maintain certain data types (e.g., data base fields, etc.) in cache.

In still other embodiments, the configuration parameters 303 can be used to communicate a data store type to the data services layer 301. The data services layer 301 relays this to the data management module, and the data management module uses the data store type to resolve query syntaxes used to interface with a data store having the input data.

Figure 4:
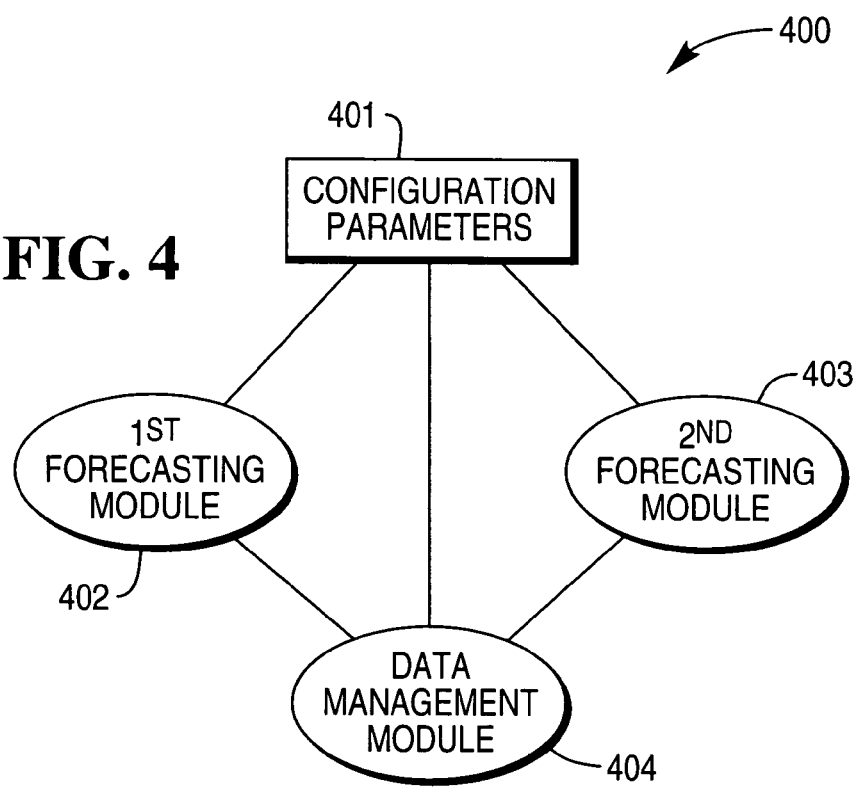
FIG. 4 depicts a diagram of a parallel processing forecasting system, according to an example embodiment of the invention.

FIG. 4 is a parallel processing forecasting system 400. The parallel processing forecasting system 400 is implemented in a machine-accessible or readable medium and is accessible and processed over a network. In one embodiment, the parallel processing forecasting system 400 includes two or more instances of the threaded forecasting module 300 of FIG. 3, and these modules 300 perform portions of the processing described above with respect to methods 100 and 200 of FIGS. 1 and 2.

The parallel processing forecasting system 400 includes configuration parameters 401, a first forecasting module 402, a second forecasting module 403, and a data management module 404. The configuration parameters 401 provide the settings for initializing the environments and processing parameters for the first and second forecasting modules 401 and 402.

The data management module 404 concurrently provides and distributes input data that is consumed by the first and second forecasting modules 402 and 403 during their concurrent processing. To do this, the data management module 404 provides some portions of the input data to the first forecasting module 402 and other or different portions of the input data to the second forecasting module 403. The data management module 404 acquires the input data and has it available for distribution to the first and second forecasting modules 402 and 403 before requests are received for that data.

Additionally, the data management module 404 records and optionally batches portions of forecasting results which are concurrently produced by the first and second forecasting modules 402 and 403 during their processing. The forecasting results represents the demand forecasts for stores, goods, services, etc., which are produced by the first and second forecasting modules 402 and 403 in response to processing the input data.

The configuration parameters 401 can be used to instruct the data management module 404 as to the specific data store type that houses the input data. The data management module 404 selects specific query syntaxes which are used to interact with the data store in response to the data store type. Other configuration parameters 401 can instruct parent or driving scripts as to the particular processing nodes that the first and second processing nodes 402 and 403 are to be loaded and executed on.

Furthermore, in some embodiments, portions of the configuration parameters 401 can instruct data services layers of the first and second forecasting modules 402 and 403 or can instruct the data management module 404 as to which data types included within the input data are to be maintained in persistent cache during the processing lifecycle of the first and second forecasting modules 402 and 403. Alternatively, portions of the configuration parameters 401 can instruct the data services layer and the first and second forecasting modules 402 and 403 or can instruct the data management module as to an amount of data which each module 402 or 403 is allowed to have in cache at any particular point during processing.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which interpreted as reflecting an intention that the claimed embodiments of the invention have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A machine-implemented method to forecast with parallel processing, comprising:

extracting, via a computer, data from a data store, wherein the data is processed to produce forecasting results;

servicing, via the computer, a first forecasting module with portions of the data, the first forecasting module processing on a first processing node, the first processing node resolved based on configuration parameters that identify that the first forecasting module is to execute on the first processing node;

concurrently servicing a second forecasting module with other portions of the data, the second forecasting module processing on a different or second processing node, the second processing node also resolved based on the configuration parameters that identity that the second forecasting module is to execute on the second processing node;

configuring the data based on particular parameters that identify some portions of the extracted data provided as the portions and the other portions that are to be made persistently available in cache so as to not be flushed from the cache to assist when some types of data are repetitively being used by the first and second forecasting modules during different processing states of the first and second forecasting modules; and concurrently producing, via the computer, the forecasting results by the first and second forecasting modules in response to concurrently processing the portions and the other portions of the data on the first and second processing nodes, respectively, and the first and second forecasting modules are duplicate instances of one another and duplicate versions of a same set of forecasting utilities that process in parallel with one another on their respective processing nodes.

2. The method of claim 1 further comprising, temporarily housing the forecasting results until the first and second forecasting modules finish processing the data.

3. The method of claim 2 further comprising, updating the data store with the temporarily housed forecasting results when the first and second forecasting modules finish processing the data.

4. The method of claim 1 further comprising, automatically adjusting the extracting of the data based on a type associated with the data store.

5. The method of claim 1 further comprising, determining the type of the data store based on configuration parameters associated with the first and second forecasting modules.

6. The method of claim 1 further comprising, routing the first forecasting module to a first node for processing and the second forecasting module to a second node for processing.

7. The method of claim 6, wherein the routing further includes determining the first and second nodes based on at least one of existing processing loads of the nodes and configuration parameters associated with the first and second forecasting modules.

8. A machine-implemented method to forecast with parallel processing, comprising:

processing on a computer a parent script having configuration parameters for a first forecasting module and a second forecasting module;

concurrently processing the first and second forecasting modules, the first and second forecasting modules are processed on multiple processing nodes, based on portions of the configuration parameters, a first processing node that executes the first forecasting module is identified in the configuration parameters and a second processing node that executes the second forecasting module is identified in the configuration parameters; and concurrently producing, on the computer, forecasting results produced by the first and second forecasting modules via the processing of the first and second forecasting modules on the multiple processing nodes, and the first and second forecasting modules are duplicate versions of a same set of forecasting utilities that process in parallel with one another on their respective processing nodes.

9. The method of claim 8 further comprising, centrally distributing data consumed by the first and second forecasting modules which is used to produce the forecasting results.

10. The method of claim 9 further comprising, centrally accumulating portions of the forecasting results until the first and second forecasting modules finish processing.

11. The method of claim 9 further comprising, maintaining portions of the data in cache for continuous distribution to the first and second forecasting modules as they process, wherein the portions are identified in the configuration parameters.

12. The method of claim 11 further comprising, removing other portions of the data from cache or storage if the other portions are not identified in the configuration parameters after the other portions are distributed to at least one of the first forecasting module and the second forecasting module.

13. The method of claim 8 further comprising, interacting with a data management module that distributes data which is processed by the first and second forecasting modules to produce the forecasting results, wherein each of the forecasting modules independently and concurrently interact with the data management module.

14. The method of claim 13 further comprising, interacting with the data management module to record the forecasting results, wherein each of the forecasting modules independently and concurrently interact with the data management module.

* * * * *